(12) United States Patent
Roth et al.

(10) Patent No.: US 10,279,724 B2
(45) Date of Patent: May 7, 2019

(54) RAMP DOOR PATIO DECK SYSTEM

(71) Applicant: LIPPERT COMPONENTS, INC., Elkhart, IN (US)

(72) Inventors: Bryan J. Roth, Topeka, IN (US); Jeffrey Albrecht, Goshen, IN (US); Dominick Bilancio, Elkhart, IN (US); Nick Plummer, Elkhart, IN (US); Kevin Peachey, Elkhart, IN (US); David G. Skinner, Elkhart, IN (US)

(73) Assignee: Lippert Components, Inc., Elkhart, IN (US)

( * ) Notice: Subject to any disclaimer, the term of this patent is extended or adjusted under 35 U.S.C. 154(b) by 0 days.

(21) Appl. No.: 15/649,407

(22) Filed: Jul. 13, 2017

(65) Prior Publication Data

US 2018/0022262 A1    Jan. 25, 2018

Related U.S. Application Data

(60) Provisional application No. 62/364,666, filed on Jul. 20, 2016.

(51) Int. Cl.
| | |
|---|---|
| B60P 3/34 | (2006.01) |
| B60P 3/36 | (2006.01) |
| B60P 1/43 | (2006.01) |
| B60J 5/10 | (2006.01) |
| E04B 1/00 | (2006.01) |
| E04F 11/18 | (2006.01) |
| E04B 1/18 | (2006.01) |
| E04F 15/02 | (2006.01) |
| E04F 11/00 | (2006.01) |
| E04F 11/02 | (2006.01) |

(52) U.S. Cl.
CPC .............. *B60P 3/34* (2013.01); *B60P 3/36* (2013.01); *E04B 1/003* (2013.01); *E04B 1/18* (2013.01); *E04F 11/18* (2013.01); *E04F 15/02* (2013.01); *B60J 5/102* (2013.01); *B60P 1/435* (2013.01); *E04F 11/002* (2013.01); *E04F 11/02* (2013.01)

(58) Field of Classification Search
CPC ..... B60P 3/34; B60P 3/36; B60P 1/435; B60J 5/102; B60R 3/007; E04B 1/003; E04B 1/18; E05F 15/627; E04F 11/02
USPC ............................................ 296/162; 52/79.6
See application file for complete search history.

(56) References Cited

U.S. PATENT DOCUMENTS

| | | | | |
|---|---|---|---|---|
| 3,462,170 A | * | 8/1969 | Smith | B60P 3/36 182/157 |
| 6,135,532 A | * | 10/2000 | Martin | B60P 1/435 14/71.1 |
| 6,736,446 B1 | * | 5/2004 | Johnson | B60P 3/36 296/162 |
| 7,686,381 B1 | * | 3/2010 | Leonard | B60P 3/343 296/162 |
| 9,884,576 B1 | * | 2/2018 | McLoughlin | B60P 1/549 |
| 2006/0006693 A1 | * | 1/2006 | Anderson | B60P 3/36 296/162 |

(Continued)

*Primary Examiner* — Gregory A Blankenship
(74) *Attorney, Agent, or Firm* — Nixon & Vanderhye P.C.

(57) ABSTRACT

A recreational vehicle (RV) includes a ramp door configurable as a ramp or as a patio deck. A stair is attachable to a side of the door. A railing extends about the perimeter of the door when in the deck configuration. First and second support cables may be connected between the door and the RV to support the door when in the deck configuration.

23 Claims, 11 Drawing Sheets

(56) References Cited

U.S. PATENT DOCUMENTS

| | | | | |
|---|---|---|---|---|
| 2006/0220410 A1* | 10/2006 | Luehr | ...................... | B60J 5/108 |
| | | | | 296/61 |
| 2007/0040405 A1* | 2/2007 | Coble | .................... | B60P 1/435 |
| | | | | 296/61 |
| 2007/0096422 A1* | 5/2007 | Dolan | ...................... | B60R 3/02 |
| | | | | 280/163 |
| 2007/0187989 A1* | 8/2007 | Brown | ...................... | B60P 3/36 |
| | | | | 296/162 |
| 2008/0296922 A1* | 12/2008 | Diamond | .................. | B60P 3/34 |
| | | | | 296/26.13 |
| 2009/0159108 A1* | 6/2009 | Dannewitz | .............. | B60P 3/064 |
| | | | | 135/88.05 |
| 2016/0096465 A1* | 4/2016 | Kauffman | ................. | B60P 3/36 |
| | | | | 296/162 |
| 2016/0144758 A1* | 5/2016 | Knapp | ................... | B60P 1/435 |
| | | | | 414/537 |
| 2018/0022262 A1* | 1/2018 | Roth | ........................ | B60P 3/34 |
| | | | | 296/162 |
| 2018/0056845 A1* | 3/2018 | Ousley | ..................... | B60P 3/34 |

* cited by examiner

Fig. 19

RAMP DOOR PATIO DECK SYSTEM

CROSS-REFERENCE TO RELATED APPLICATION

This application claims benefit under 35 U.S.C. § 119 of U.S. Provisional Patent Application No. 62/364,666, filed on Jul. 20, 2016, and incorporates by reference the disclosure thereof in its entirety.

BACKGROUND AND SUMMARY OF THE DISCLOSURE

A recreational vehicle or trailer (RV) may be provided with a door (sometimes referred to as a ramp door) that is pivotally connected to the vehicle proximate a floor thereof and pivotable about an axis parallel to the floor and to a wall (typically a rear wall) of the vehicle in which the door may be installed. Such a door typically has a first (or connected) end, a second (or free) end, a first side, and a second side. In embodiments wherein the door is in a rear wall of the vehicle, the first side may be a driver's side and the second side may be a passenger side. In an embodiment, the ramp door may effectively be the rear wall of the vehicle.

Such a door may be used in a ramp configuration wherein the door extends between the interior of the vehicle and the ground. In the ramp configuration, the door may serve as a loading ramp facilitating loading and unloading of cargo to and from the vehicle. In the ramp configuration, the connected end of the door typically would be supported by the vehicle and the free end of the door typically would be supported by the ground.

Alternatively, such a door may be used in a deck configuration wherein the door is parallel to a floor of the vehicle. In this configuration, with the floor of the vehicle and, therefore, the ramp door, leveled, the ramp door can be used as a patio deck. In the deck configuration, the connected end of the door typically would be supported by the vehicle. The free end of the door typically would be supported by a first support cable extending between an upper portion of the vehicle (or door frame attached to the vehicle) proximate the first side of the vehicle and a first cable mount located proximate the free end and the first side of the door, and by a second support cable extending between an upper portion of the vehicle (or door frame attached to the vehicle) proximate the second side of the vehicle and a second cable mount located proximate the free end and the second side of the door. The first and second cable mounts typically would be located at about the same distance from the free end of the door, which distance typically would be a short distance so that only a small portion of the door would be cantilevered about a line connecting the first and second cable mounts.

With the door in the deck configuration, stairs may be connected to or otherwise provided adjacent the door to provide access between the door (sometimes referred to herein as the "deck" when in the deck configuration) and the ground. Such stairs typically extend from the free end of the deck and away from the vehicle. It would be desirable to extend the stairs from the side of the deck to better integrate the deck with the area about the entry door of the RV, which typically is located on the passenger side of the RV. The foregoing door support cables, however, preclude extending the stairs from the side of the deck because the cables would interfere with users accessing the stairs from the deck and vice versa.

A railing may be provided to protect against users falling off of the patio deck. The railing typically is supported by posts attached to a peripheral edge or surface of the door. The railing typically includes a first side section extending from the vehicle along the first side of the door, a first return section extending from the first side of the door along the free end of the door to a first side of the stair, a second side section extending from the vehicle along the second side of the door, and a second return section extending from the second side of the door along the free end of the door to a second side of the stair. The first side section and the first return section may be interconnected so that each such section provides lateral support for the other. The second side section and the second return section may be similarly interconnected.

DESCRIPTION OF ILLUSTRATIVE EMBODIMENTS

The present disclosure illustrates and describes an RV 10 having a ramp door 12 that can be deployed in a deck configuration, a stair 14 removably attachable to a side of the door, and a railing 16 removably attachable to the door and extending about the periphery of the door when the door is in a deck configuration.

The door 12 has a first (or connected or pivot) end 18, a second (or free) end 20, a first side 22, and a second side 24. The door 12 may be pivotally connected to the RV 10 in a conventional manner, for example, by a hinge 13 connected to the door and to a door frame (or hoop) 26 installed in a wall W (or between walls W) of the RV or directly to walls W, a floor F, or another structural component of the RV. In an embodiment, a first support cable 28 may be connected between the RV 10 or the hoop 26 and a first cable mount 30 in any suitable manner, with the first cable mount located on the door 12 proximate the first side 22 of the door and a short, first distance from the free end 20 of the door. A second support cable 32 may be connected between the RV 10 or hoop 26 and a second cable mount 34 in an suitable manner, with the second cable mount located on the door 12 proximate the second side 24 of the door and a second distance from the free end 20 of the door, the second distance being substantially greater than the first distance. Typically, the first cable mount 30 is much nearer to the free end 20 of the door than to the connected end 18 of the door. Typically, the second cable mount 34 is nearer to the free end 20 of the door than to the connected end 18 of the door. In an embodiment, the second cable mount 34 could be nearer to the connected end 18 of the door 12 than to the free end 20 of the door.

Figure 18:
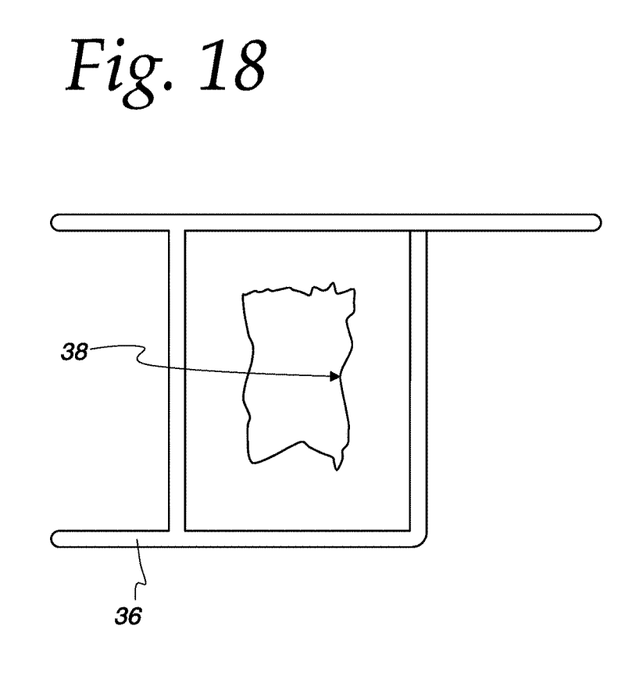
FIG. 18 is a cross-sectional view of the H-channel of FIG. 17 further comprising a foam element within a channel section thereof.
Figure 19:
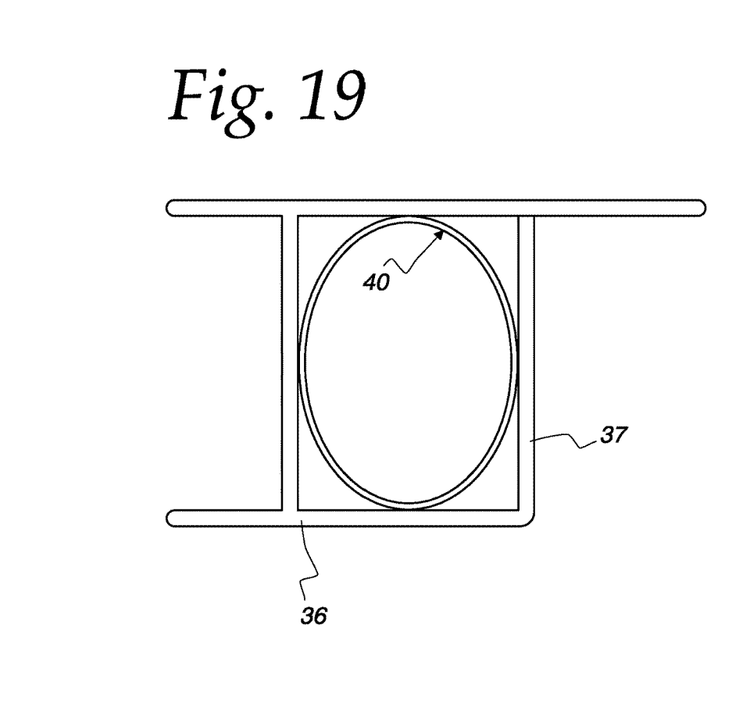
FIG. 19 is a cross-sectional view of the H-channel of FIG. 17 further comprising a tube within a channel section thereof.
Figure 20:
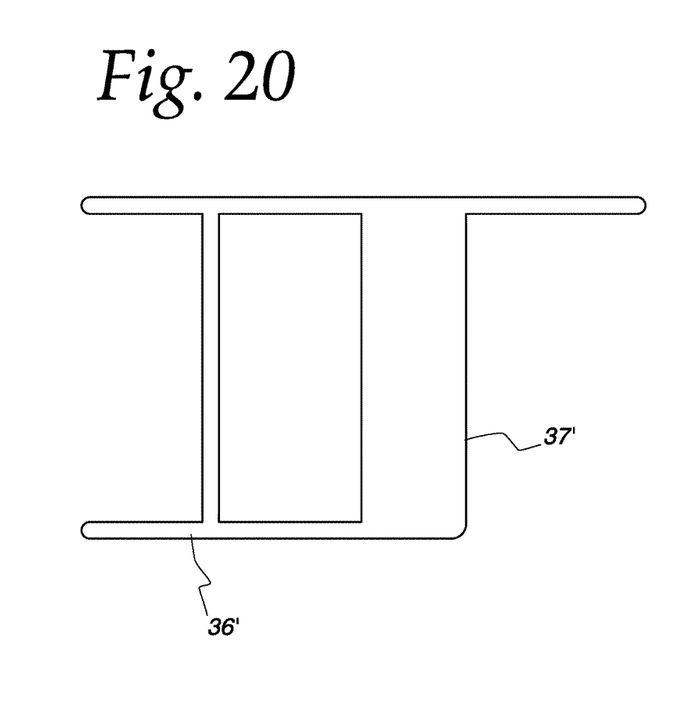
FIG. 20 is a cross-sectional view of an H-channel similar to the H-channel of FIG. 17 but having a thickened web.

With the door 12 in the deck configuration, a portion of the door between the free end 20 of the door and a line connecting the first and second cable mounts 30, 34 is thus cantilevered about the line connecting the first and second cable mounts. At least the cantilevered portion of the door 12 may be structurally reinforced to withstand loads applied to the cantilevered portion. For example, as shown in FIGS. 18-20, a structural member 36 of a peripheral frame of the door 12 may be reinforced with foam or tubing, or the cross-section of one or more portions of the structural member may be increased to provide additional strength. More specifically, FIGS. 18-20 show embodiments of an elongated structural member 36 of the door frame, the member 36 defining an elongated channel C therethrough. FIG. 18 shows a foam element 38 disposed within the channel C and adhered to walls of the member 36 defining the channel. FIG. 19 shows an ovalized tube 40 disposed within the channel C and abutting walls of the member 36 defining the channel. FIG. 20 shows a structural member 36' including at least one wall 37' having a thickness substantially greater than the thickness of an analogous wall 37 of the member 36 shown in FIGS. 18 and 19.

The stair 14 is removably attachable to the second side 24 of the door 12 between the free end 20 of the door and the second cable mount 34. The stair 14 may be attached to the door 10 using any suitable means. For example, one or more stair mounts 42 configured to removably receive a corresponding portion of the stair 14 may be connected to the door 12, for example, proximate a peripheral portion of an inner surface of the door (that is, the upper surface of the door when the door is the deck configuration. The stair 14 may be removably engaged with the stair mount 42 as desired. In an embodiment, the stair/door connection may be substantially rigid so that a load applied to the door 12 may be substantially transferred to the stair 14. In turn, the load may be substantially transferred to the ground underneath the stair 14. The stair 14 may be collapsible or have a fixed configuration. The stair 14 may include a hand rail 44, which may be removable from the stair.

In an embodiment, a leg 46 may extend from an upper portion of the stair 14, proximate the stair mount 42 or the door 12. Alternatively, the leg 46 may be connected to the stair mount 42 instead of the stair 14. In an embodiment, the leg 46 may extend from the side of the stair 14 or stair mount 42 closer to the free end 20 of the door 14. So connected, the leg 46 may provide support for the free end 20 of the door 12 through the stair 14 or the stair mount 42. The leg 46 may be telescopic or otherwise length-adjustable to accommodate uneven terrain upon which the RV may be parked. A foot 47 may be pivotally (as shown) or fixedly connected to the lower end of the leg 46. The leg 46 may be removable from the stair 14 or the stair mount 42, or collapsible against the stair to facilitate storage of the stair and the leg.

The railing 16 may include a first side section 50 extending from the first side 22 of the RV 10 or hoop 26 to the free end 20 of the door 12, an end section 52 extending from the first side 22 of the door to the second side 24 of the door, and a second side section 54 extending from the second side of the RV or hoop to the side of the stair 14 distant from the free end of the door. The first side section 50 and the first end of the end section 52 (the end of the end section proximate the first side 22 of the door 12) may be interconnected to provide lateral support for each other. The first side section 50 may receive additional outward lateral support from the first support cable 28. More specifically, the first side section 50 may be located inboard of the first support cable 28 so that the first support cable may mitigate outward lateral displacement of the first side section in response to an outward lateral load applied thereto. In an embodiment, the first side section 50 could be removably attached to the first support cable 28. In such an embodiment, the first support cable 28 could also mitigate inward lateral displacement of the first side section 50 in response to an inward lateral load applied thereto.

Figure 16:
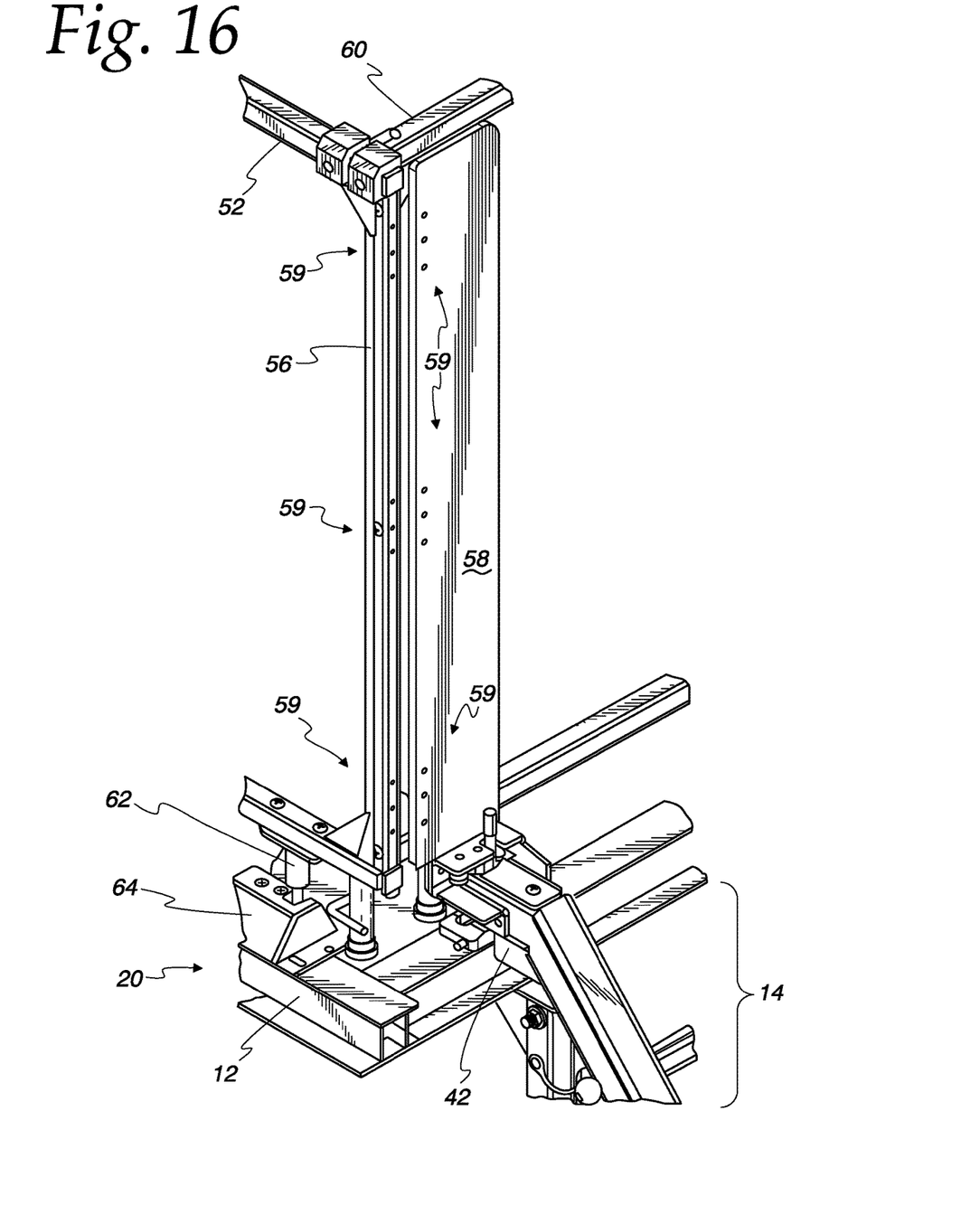
FIG. 16 is a perspective view of the door, a stair mount attached to the door, the stair attached to the stair mount, the railing attached to the door, and a support panel pivotally attached to a post of the railing and selectively latched to the stair mount.
Figure 17:
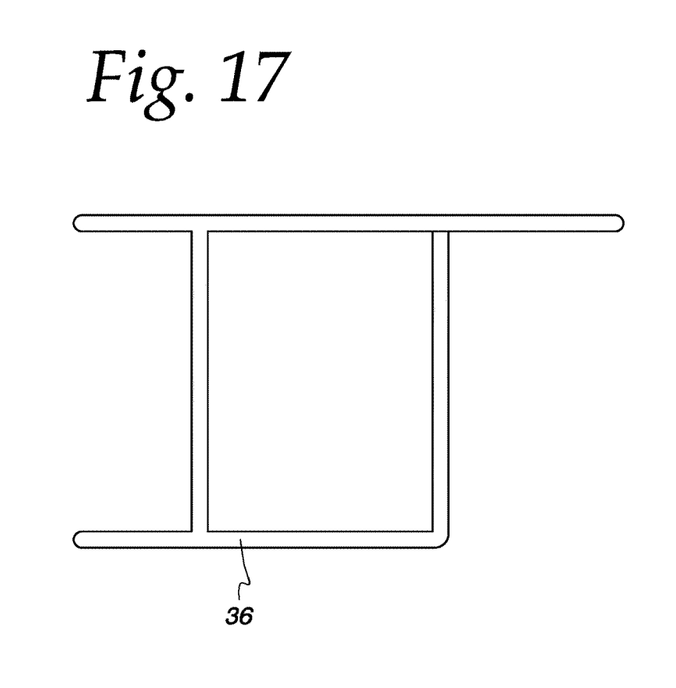
FIG. 17 is a cross-sectional view of an H-channel as might be used to form a peripheral frame of the door.

The second end of the end section 52 (the end proximate the second side 24 of the door 12) may be removably interconnected with the stair 14 or the stair mount 42 to provide further lateral support for the end section. For example, as best shown in FIG. 16, the second end of the end section 52 may include an upright 56 and a latch plate 58 pivotally attached to the upright, for example, by hinges 59. With the railing 16 and the stair 14 installed to the door 12, the latch plate 58 may be pivoted into releasably latched engagement with the stair or the stair mount 42, thereby providing lateral support for that end of the stair. Alternatively, the latch plate 58 may be pivoted into releasably latched engagement with a further mount (not shown) attached to the door 10. Such a further mount could be similar to the stair mount 42 or the post mounts 64 discussed further below. In an embodiment, the second end of the end section 52 could be interconnected with a hand rail 44 of the stair 14, thereby providing lateral support for both the second end of the end section and the stair.

The second side section 54 could receive lateral support from the second support cable 32 in a manner similar to that in which the first side section 50 receives lateral support from the first support cable 28. In an embodiment, the second side section 54 could be interconnected with a hand rail 44 of the stair 14 to further provide lateral support for the second side section. The second side section 54 may include a gate 60 operable to selectively preclude access to the stair 14 from the deck or access to the deck from the stair. In an embodiment, the gate 60 may be slidingly engaged with the second side section 54 of the rail 16. In another embodiment, the gate 60 may be pivotally engaged with the upright 56 or otherwise with the end section 52. In either embodiment, the gate 60 could be interconnected with the end section 52 when the gate is closed to further provide lateral support for the second side section 54.

The railing sections 50, 52, 54 may be supported by posts 62. Any or all of the posts 62 may be length-adjustable. For example, each post may include a first portion 66 and a second portion 68 threadingly connected to the first portion so that rotation of the first portion with respect to the second portion in a first direction increases the length of the post, and rotation of the first portion with respect to the second portion in a second direction decreases the length of the post. The second portion 68 of the post may include a shaft 70 and a head 72 at the free end of the shaft portion.

Figure 1:
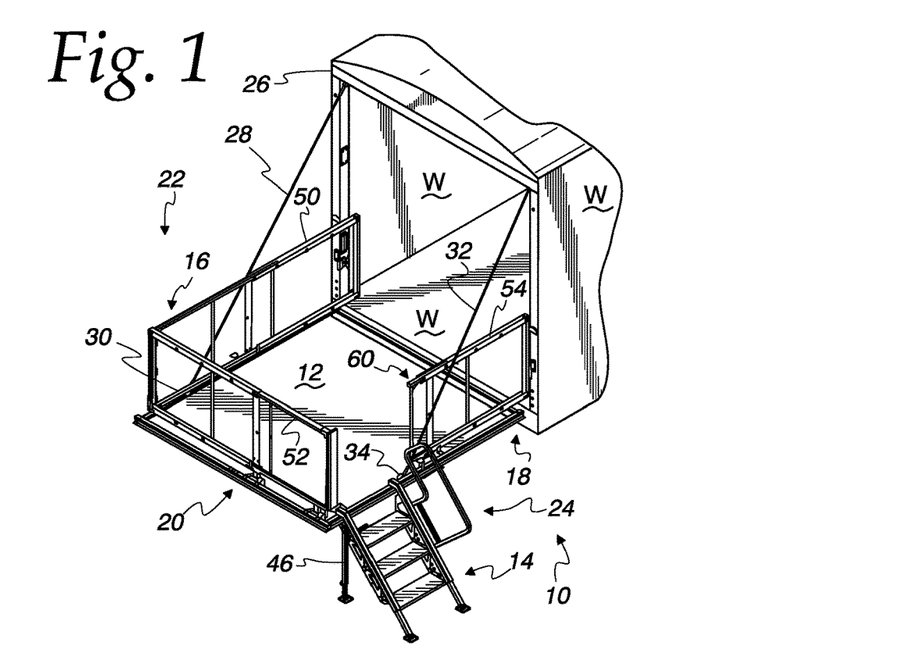
FIG. 1 is a perspective view of an RV having a ramp door deployed in a patio deck configuration and supported by first and second support cables, a stair removably attached to a second side of the door, and a railing extending about the perimeter of the door, with a gate in an open position, thereby allowing access between the stair and the deck.
Figure 2:
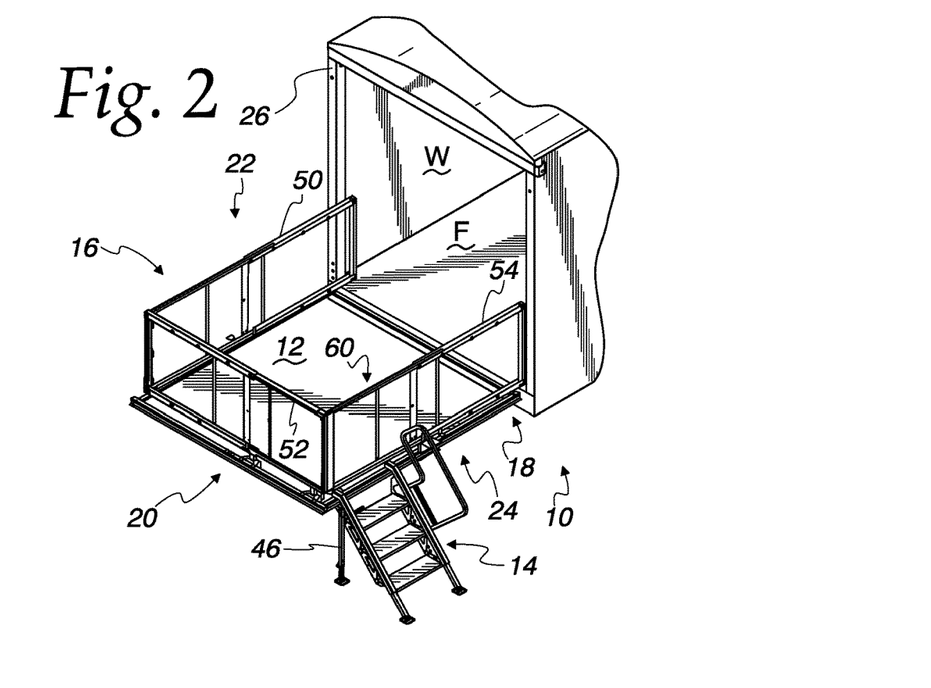
FIG. 2 is a perspective view similar to that of FIG. 1, with the support cables omitted for clarity, and with the gate in a closed position, thereby blocking access between the stair and the deck.
Figure 3:
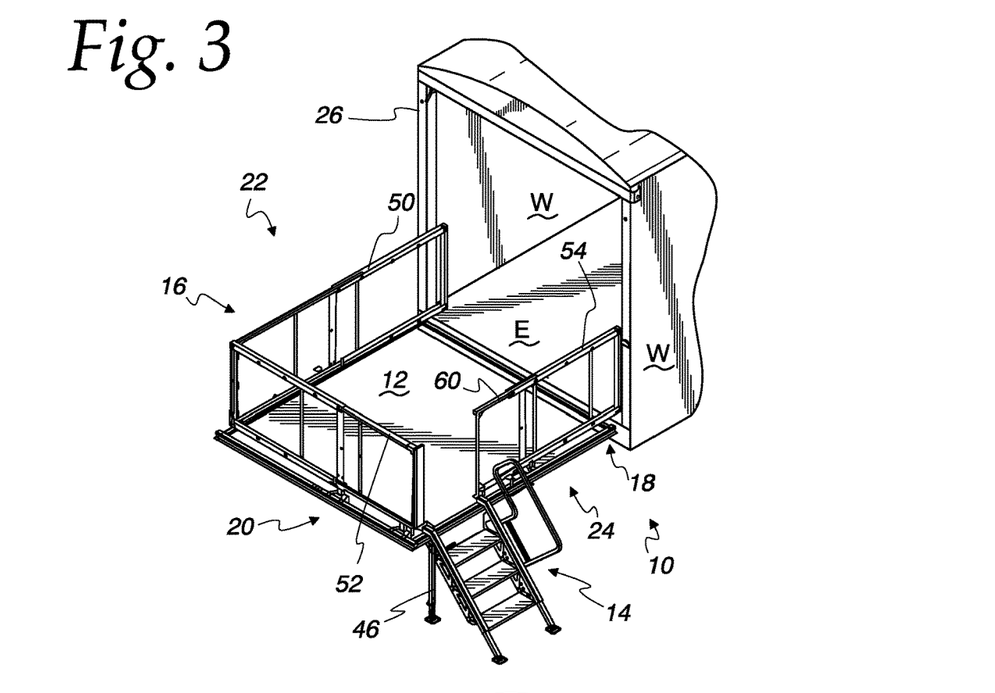
FIG. 3 is a perspective view similar to that of FIG. 2, with the gate in an open position, thereby allowing access between the stair and the deck.
Figure 4:
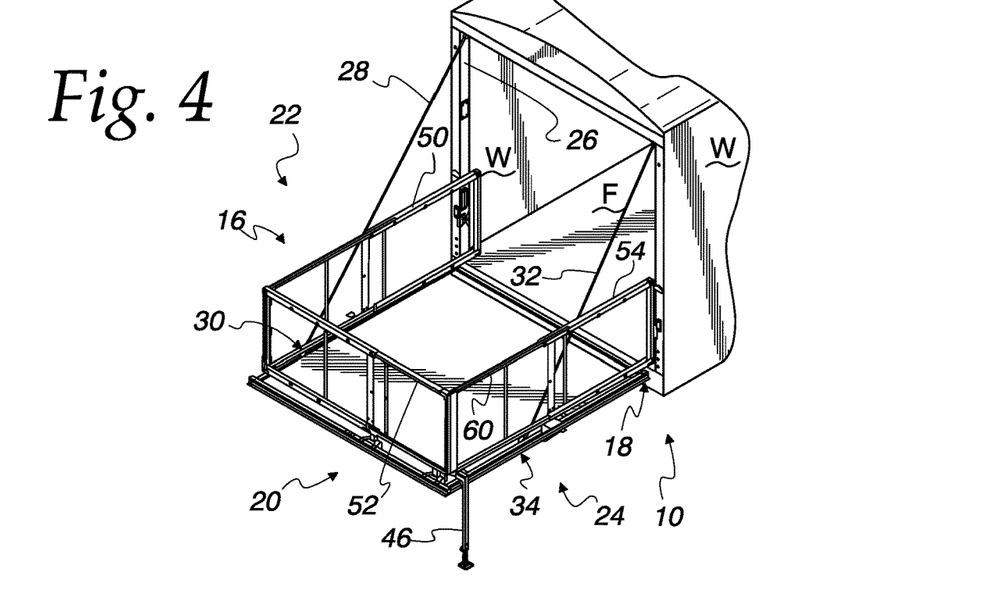
FIG. 4 is a perspective view similar to that of FIG. 1, with the stair omitted for clarity and the gate in a closed position.
Figure 5:
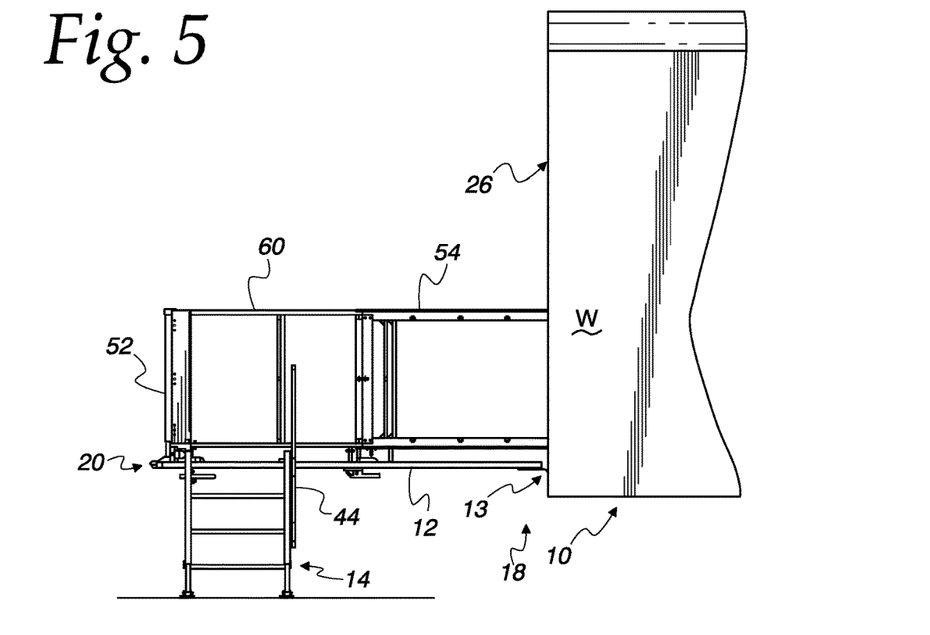
FIG. 5 is a side elevation view generally corresponding to the perspective view of FIG. 2.
Figure 6:
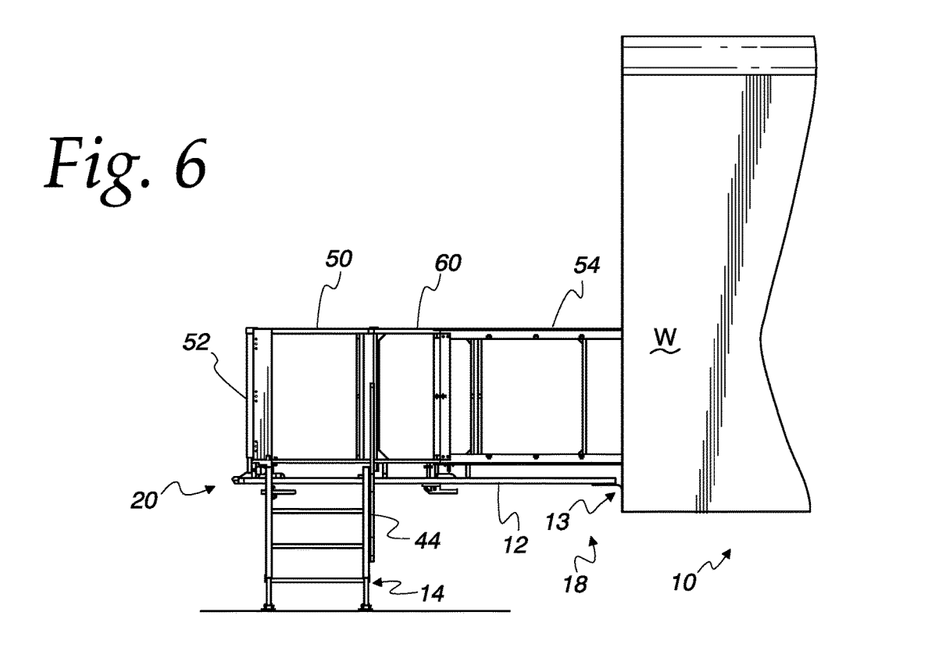
FIG. 6 is a side elevation view generally corresponding to the perspective view of FIG. 3.
Figure 7:
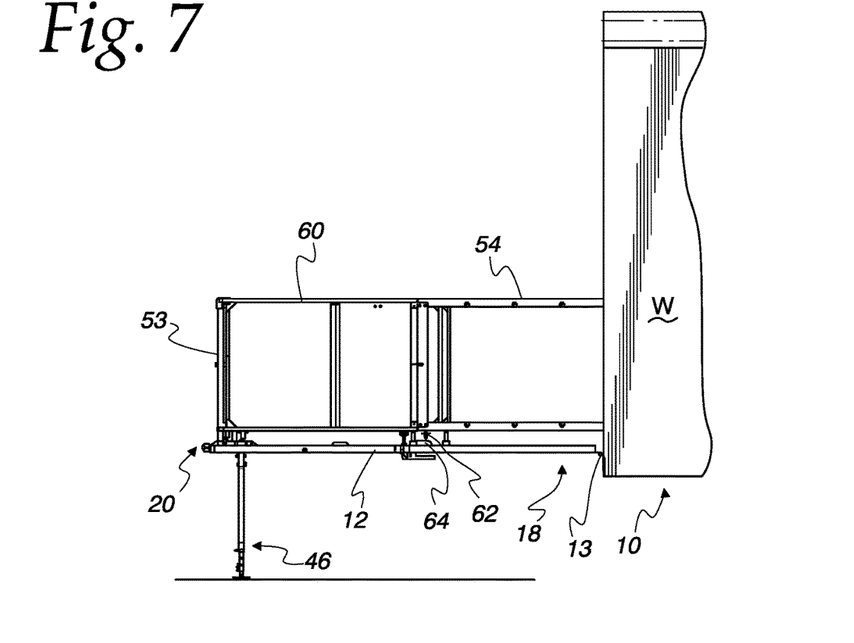
FIG. 7 is a side elevation view generally corresponding to the perspective view of FIG. 4, with the support cables omitted for clarity.
Figure 8:
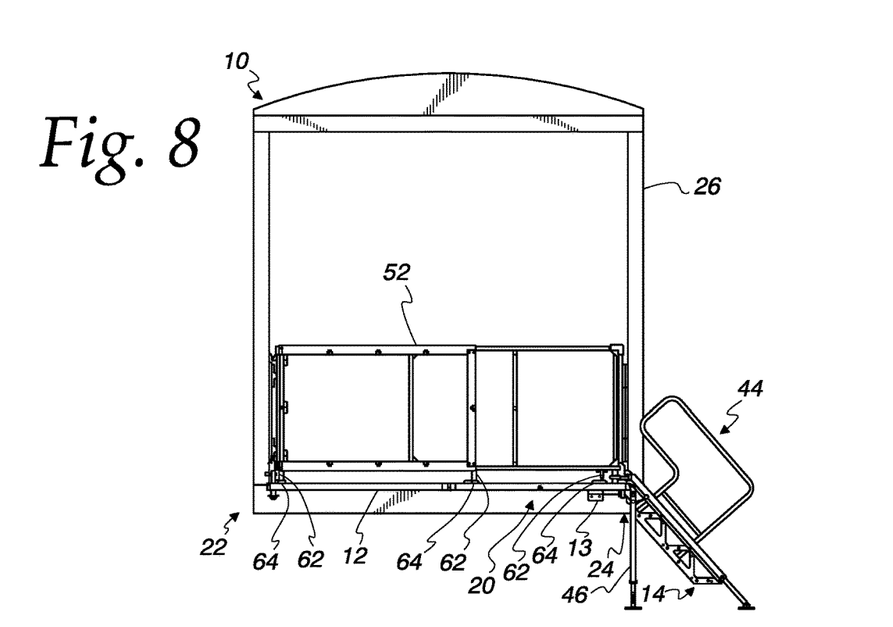
FIG. 8 is a front elevation view generally corresponding to the perspective view of FIG. 2.
Figure 9:
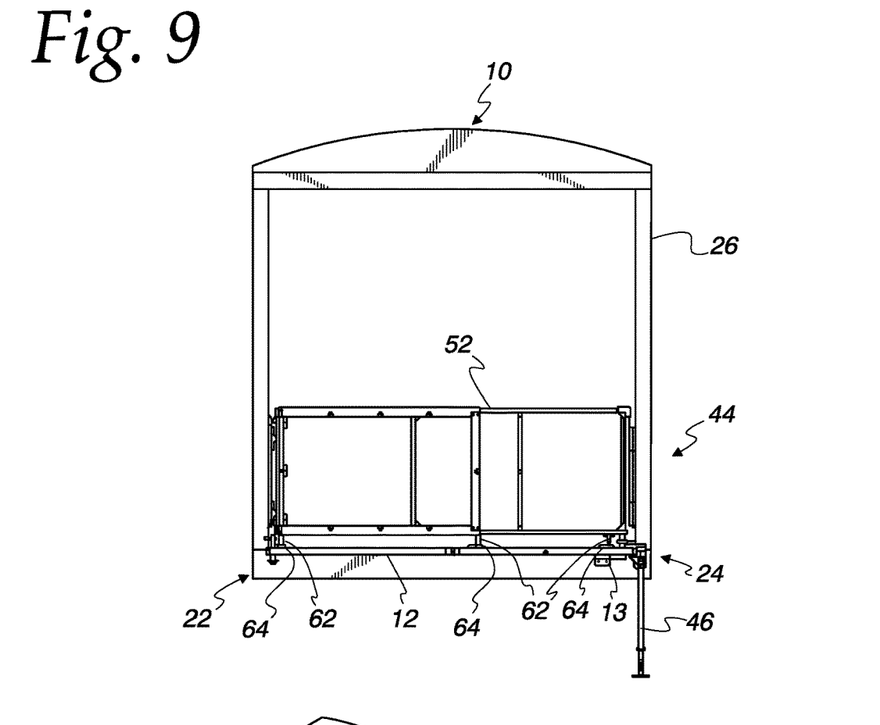
FIG. 9 is a front elevation view generally corresponding to the perspective view of FIG. 4, with the support cables removed for clarity.
Figure 10:
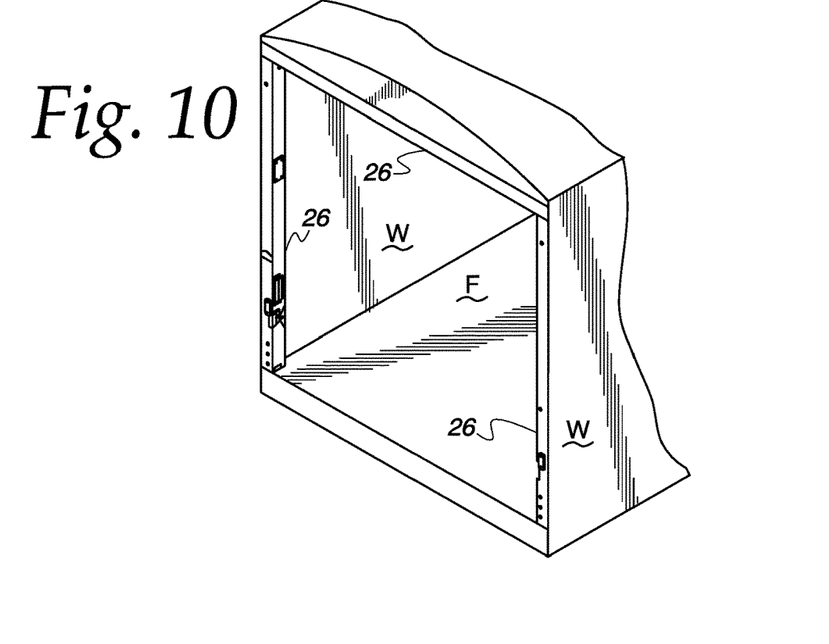
FIG. 10 is a perspective view of the RV and a door frame (or hoop) installed in a rear wall of the RV with the door omitted for clarity.
Figure 11:
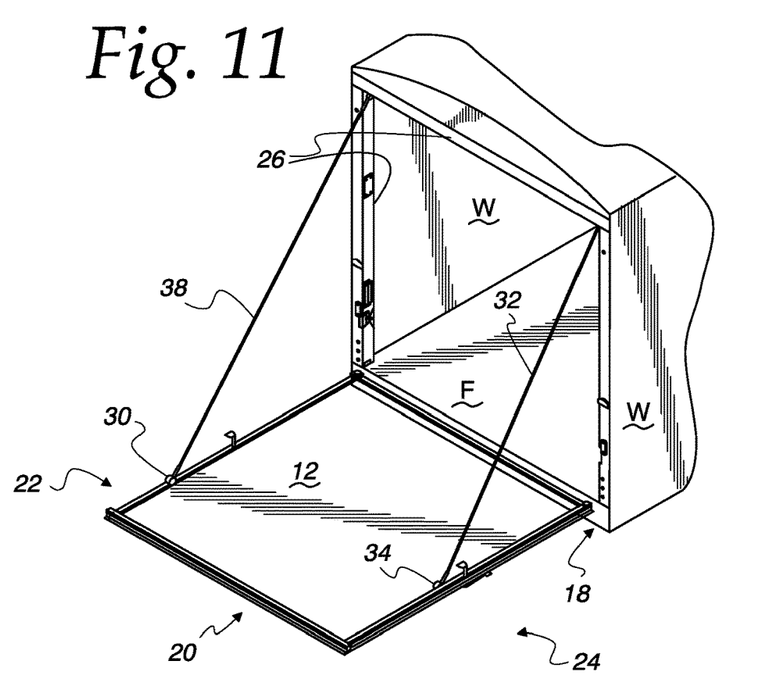
FIG. 11 is a perspective view of the RV, the door frame, the door pivotally attached to the RV and in an open position, and first and second support cables connected between the door and the RV or the door frame.
Figure 12:
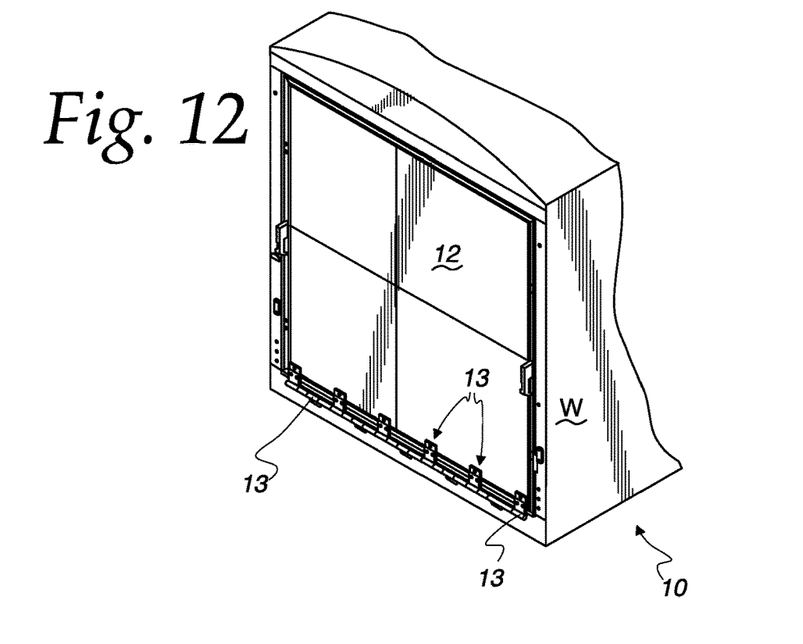
FIG. 12 is a perspective view of the RV, the door frame, and the door pivotally attached to the RV and in a closed position.
Figure 13:
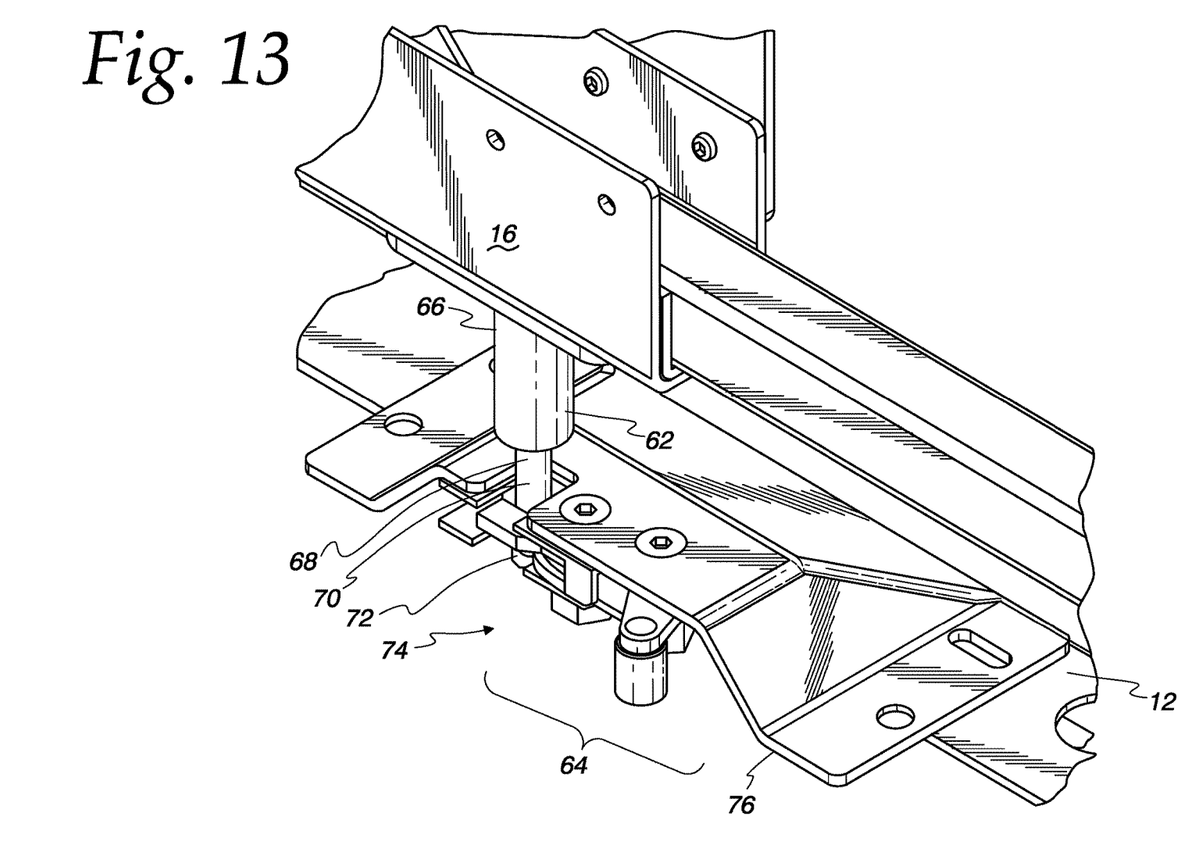
FIG. 13 is a perspective view of a post mount attached to the door and engaging a post of the railing.
Figure 14:
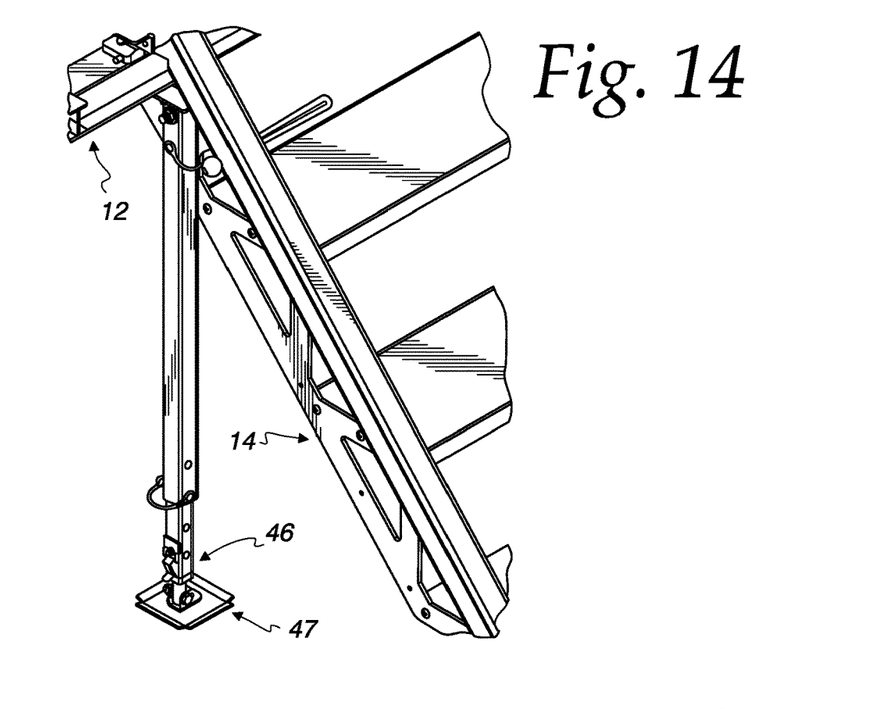
FIG. 14 is a perspective view of the drop leg attached to the stair and the stair attached to the door.
Figure 15:
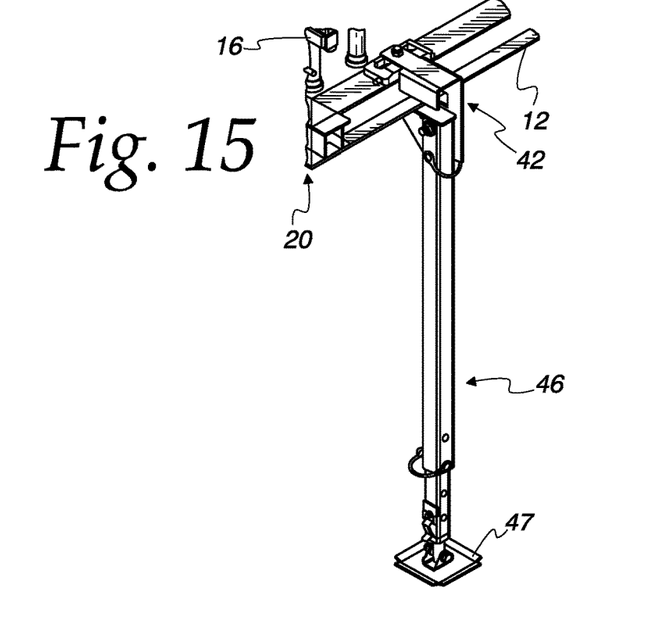
FIG. 15 is a perspective view similar to FIG. 14, with the stair assembly omitted for clarity.

Any or all of the posts 62 may be releasably engageable with post mounts 64 that may be attached to the door 12. An illustrative post mount 64 is shown in FIG. 13. The post mount 64 includes a latch 74, for example, a rotary latch, configured to latch about the shaft 72 of the lower portion 68 of the post 62 in a manner that captures the head 72 between the latch and the door 12. The post mount 64 may also include a housing or cover 76 connected to the door 12 and overlying the latch 74.

The post mount 64 may be configured to allow the lower portion 68 of the post 62 to "float" axially between the surface of the door 12 and latch 74 when the post is engaged by the latch 74. Such "float" may allow for the door 12 to deflect a limited amount in an area about the post mount 64 without the latch 74 axially engaging and axially moving the post 62. Such door deflection may occur during normal use of the door 12 as a patio deck, for example, in response to persons walking on the door when the door is in a deck configuration.

In an embodiment, the first and second support cables 28, 32 and the first and second cable mounts 30, 34 could be omitted, and the ramp door 12 could be supported in the patio deck configuration by legs located at the opposite sides of the door near the free end 20 of the door. Such legs could include or be similar to the leg 46, and they could be connected to the door 12 in a similar manner.

The foregoing embodiments are illustrative and may be modified without deviating from the scope of the appended claims. Features disclosed in connection with a given embodiment may be incorporated into any other embodiment to the greatest extent possible.

The invention claimed is:

1. A system comprising:
  a door frame attachable to a vehicle, the door frame having a first jamb, a second jamb opposite the first jamb, and a header extending between the first jamb and the second jamb;
  a door having a first side, a second side, a pivot end, and a free end, the pivot end of the door configured for pivoting about a pivot axis parallel to the header between a first position wherein the door is substantially disposed within and/or substantially in abutment with the door frame and a second position wherein the door is substantially perpendicular to the first position;
  the door comprising a first cable mount proximate the first side thereof and proximate the free end thereof;
  the door further comprising a second cable mount proximate the second side thereof and intermediate the free end thereof and the pivot end thereof, the pivot end of the door further from the first cable mount than from the second cable mount;
  a first cable having a first end connected to the door frame and a second end connected to the first cable mount; and
  a second cable having a first end connected to the door frame and a second end connected to the second cable mount.

2. The system of claim 1 further comprising a stair removably connectable to the second side of the door between the free end of the door and the second cable mount.

3. The system of claim 2 further comprising a rail having a first rail section, a second rail section, and a third rail section, the first rail section connected to the first side of the door frame and removably connectable to the first side of the door between the pivot end of the door and the free end of the door, the second rail section connected to the second side of the door frame and removably connectable to the second side of the door between the pivot end of the door and the stair, and the third rail section removably connectable to the free end of the door between the first side of the door and the second side of the door.

4. The system of claim 3 wherein at least one of the first rail section and the second rail section is pivotally connected to the respective one of the first jamb and the second jamb and pivotable about a pivot axis.

5. The system of claim 4 wherein the pivot axis is parallel to the respective one of the first jamb and the second jamb.

6. The system of claim 4 wherein the pivot axis is perpendicular to the respective one of the first jamb and the second jamb.

7. The system of claim 2 further comprising a rail having a first rail section, a second rail section, and a third rail section, the first rail section removably connectable to the first side of the door frame and removably connectable to the first side of the door between the pivot end of the door and the free end of the door, the second rail section removably connected to the second side of the door frame and removably connectable to the second side of the door between the pivot end of the door and the stair, and the third rail section removably connectable to the free end of the door between the first side of the door and the second side of the door.

8. The system of claim 1 further comprising a post retainer attached to the door, the post retainer comprising a rotary latch and a cover overlying the rotary latch.

9. The system of claim 8 further comprising a removable rail section, the removable rail section comprising a post, the post having a head and a shaft, the post configured for selective engagement with the rotary latch with the head of the post between the door and the rotary latch.

10. The system of claim 9 wherein the length of the post is adjustable.

11. A vehicle comprising:
  a floor;
  a wall extending from the floor;

a door frame attached to the wall, the door frame having a first jamb, a second jamb opposite the first jamb, and a header;

a door having a first side, a second side opposite the first side, a pivot end, and a free end opposite the attachment end, the pivot end of the door pivotally connected to the door frame or otherwise to the vehicle for pivoting about a pivot axis parallel to the header between a first position wherein the door is substantially disposed within and/or substantially in abutment with the door frame and a second position substantially perpendicular to the first position;

the door comprising a first cable mount proximate the first side thereof and proximate the free end thereof;

the door further comprising a second cable mount proximate the second side thereof and intermediate the free end thereof and the pivot end thereof, the pivot end of the door further from the first cable mount than from the second cable mount;

a first cable having a first end connected to the first jamb and a second end connected to the first cable mount; and a second cable substantially shorter than the first cable, the second cable having a first end connected to the second jamb and a second end connected to the second cable mount.

12. The vehicle of claim 11 further comprising a stair removably connectable to the second side of the door between the free end of the door and the second cable mount.

13. The vehicle of claim 12 further comprising a rail having a first rail section, a second rail section, and a third rail section, the first rail section connected to the first side of the door frame and removably connectable to the first side of the door between the door frame and the free end of the door, the second rail section connected to the second side of the door frame and removably connectable to the second side of the door between the door frame and the stair, and the third rail section removably connectable to the free end of the between the first side of the door and the second side of the door.

14. The system of claim 13 wherein at least one of the first rail section and the second rail section is pivotally connected to the respective one of the first jamb and the second jamb and pivotable about a pivot axis.

15. The system of claim 14 wherein the pivot axis is parallel to the respective one of the first jamb and the second jamb.

16. The system of claim 14 wherein the pivot axis is perpendicular to the respective one of the first jamb and the second jamb.

17. The system of claim 12 further comprising a rail having a first rail section, a second rail section, and a third rail section, the first rail section removably connectable to the first side of the door frame and removably connectable to the first side of the door between the pivot end of the door and the free end of the door, the second rail section removably connected to the second side of the door frame and removably connectable to the second side of the door between the pivot end of the door and the stair, and the third rail section removably connectable to the free end of the between the first side of the door and the second side of the door.

18. The system of claim 11 further comprising a post retainer attached to the door, the post retainer comprising a rotary latch and a cover overlying the rotary latch.

19. The system of claim 18 further comprising a removable rail section, the removable rail section comprising a post, the post having a head and a shaft, the post configured for selective engagement with the rotary latch with the head of the post between the door and the rotary latch.

20. The system of claim 19 wherein the length of the post is adjustable.

21. A system comprising:

a door frame attachable to a vehicle, the door frame having a first jamb, a second jamb opposite the first jamb, and a header extending between the first jamb and the second jamb;

a door having a first side, a second side, a pivot end, and a free end, the pivot end of the door configured for pivoting about a pivot axis parallel to the header between a first position wherein the door is substantially disposed within and/or substantially in abutment with the door frame and a second position wherein the door is substantially perpendicular to the first position;

the door comprising a first cable mount proximate the first side thereof and proximate the free end thereof;

the door further comprising a second cable mount proximate the second side thereof and intermediate the free end thereof and the pivot end thereof, the pivot end of the door further from the first cable mount than from the second cable mount;

a first cable having a first end connected to the first jamb and a second end connected to the first cable mount; and a second cable substantially shorter than the first cable, the second cable having a first end connected to the second jamb and a second end connected to the second cable mount;

a stair removably connectable to the second side of the door proximate the free end of the door and between the free and of the door and the pivot end of the door; and a rail having a first rail section, a second rail section, and a third rail section, the first rail section removably connectable to the first side of the door frame and removably connectable to the first side of the door between the pivot end of the door and the free end of the door, the second rail section removably connected to the second side of the door frame and removably connectable to the second side of the door between the pivot end of the door and the stair, and the third rail section removably connectable to the free end of the door between the first side of the door and the second side of the door.

22. The system of claim 21, the third rail section comprising an upright and a latch plate pivotally connected to the upright, the latch plate releasably latchable to the stair or the door.

23. The system of claim 21 further comprising a support leg removably connectable to the door proximate the free end of the door.

* * * * *